United States Patent
Govoni et al.

(10) Patent No.: US 6,689,845 B1
(45) Date of Patent: Feb. 10, 2004

(54) PROCESS AND APPARATUS FOR THE GAS-PHASE POLYMERIZATION

(75) Inventors: Gabriele Govoni, Renazzo (IT); Massimo Covezzi, Ferrara (IT)

(73) Assignee: Basell Poliolefine Italia S.p.A., Milan (IT)

(*) Notice: Subject to any disclaimer, the term of this patent is extended or adjusted under 35 U.S.C. 154(b) by 0 days.

(21) Appl. No.: 09/486,949

(22) PCT Filed: Jul. 3, 1999

(86) PCT No.: PCT/EP99/04722

§ 371 (c)(1),
(2), (4) Date: Mar. 2, 2000

(87) PCT Pub. No.: WO00/02929

PCT Pub. Date: Jan. 20, 2000

(30) Foreign Application Priority Data

Jul. 8, 1998 (EP) .............................. 98202280

(51) Int. Cl.⁷ .................................................. C08F 2/34
(52) U.S. Cl. .............................. 526/65; 526/67; 526/64; 422/132
(58) Field of Search ........................... 526/901, 65, 67, 526/64; 422/132

(56) References Cited

U.S. PATENT DOCUMENTS 4,356,082 A * 10/1982 Gross ........................ 208/164

FOREIGN PATENT DOCUMENTS

| EP | 0154334 | 9/1985 | |
| EP | 301872 | 1/1989 | ............. C08F/2/34 |
| EP | 0478418 | 4/1992 | |
| EP | 574821 | 12/1993 | ........... C08F/10/00 |
| EP | 0824115 | 2/1998 | |
| EP | 0728769 | 8/1998 | |
| WO | 9221706 | 12/1992 | |
| WO | 9704015 | 2/1997 | |
| WO | 9900430 | 1/1999 | |

OTHER PUBLICATIONS

J. Yerushalmi, "High Velocity Fluidized Beds", Gas Fluidization Technology, pp. 155–156, (1986) John Wiley & Sons Ltd.

* cited by examiner

Primary Examiner—David W. Wu
Assistant Examiner—William K. Cheung

(57) ABSTRACT

A process for the gas-phase catalytic polymerisation carried out in two interconnected polymerisation zones, to which one or more monomers are fed in the presence of a catalyst under polymerisation conditions and from which the produced polymer is discharged. The growing polymer particles flow through a first poly-merisation zone under fast fluidisation conditions, leave said first zone and enter a second polymerisation zone through which they flow in a densified form under the action of gravity, leave said second zone and are reintroduced into the first polymerisation zone, thus establishing a circulation of polymer between the two polymerisation zones. The present invention is characterised in that a gas of composition different from that present in the first polymerisation zone is introduced into the second polymerisation zone and it is avoided that the gases present in the first polymerisation zone are introduced into the second polymerisation zone. The process is particularly suited for obtaining in-reactor made blends of olefin polymers having different compositions.

23 Claims, 4 Drawing Sheets

PROCESS AND APPARATUS FOR THE GAS-PHASE POLYMERIZATION

The present invention relates to a process for the gas-phase catalytic polymerisation, particularly for the polymerisation of $\alpha$-olefins, carried out in two or more interconnected polymerization zones to which one or more monomers are fed in the presence of a catalyst under polymerization conditions and from which the produced polymer is discharged. The development of olefin polymerization catalysts with high activity and selectivity, particularly of the Ziegler-Natta type and, more recently, of the metallocene type, has led to the widespread use on an industrial scale of processes in which the polymerization of olefins is carried out in a gaseous medium in the presence of a solid catalyst. A widely used technology for gas-phase polymerization processes is the fluidized-bed technology. In fluidized-bed gas-phase processes, the polymer is confined in a vertical cylindrical zone. The reaction gases exiting the reactor are taken up by a compressor, cooled and sent back, together with make-up monomers and appropriate quantities of hydrogen, to the bottom of the bed through a distributor. Entrainment of solid in the gas is limited by an appropriate dimensioning of the upper part of the reactor (freeboard, i.e. the space between the bed surface and the gas exit point), where the gas velocity is reduced, and, in some designs, by the interposition of cyclones in the exit gas line. The flow rate of the circulating gas is set so as to assure a velocity within an adequate range above the minimum fluidization velocity and below the "transport velocity". The heat of reaction is removed exclusively by cooling the circulating gas. The catalyst components may be fed in continuously into the polymerization vessel. The composition of the gas-phase controls the composition of the polymer. The reactor is operated at constant pressure, normally in the range 1–3 MPa. The reaction kinetics is controlled by the addition of inert gases.

A significant contribution to the reliability of the fluidized-bed reactor technology in the polymerization of a-olefins was made by the introduction of suitably pretreated spheroidal catalyst of controlled dimensions and by the use of propane as diluent (see WO 92/21706). Since fluidized-bed reactors approximate very closely the ideal behaviour of a "continuous stirred-tank reactor" (CSTR), it is very difficult to obtain products which are a homogeneous mixture of different types of polymeric chains. In fact, the composition of the gaseous mixture that is in contact with the growing polymer particle is essentially the same for all the residence time of the particle in the reactor. As an example, one of the major limits of fluidized-bed processes is the difficulty of broadening the molecular weight distribution of the obtained polymers. It is generally known that, in the continuous polymerization of $\alpha$-olefins in a single stirred stage (which also involves steady composition of the monomers and of the chain transfer agent, normally hydrogen) with Ti-based catalysts of the Ziegler-Natta type, polyolefins having a relatively narrow molecular weight distribution are obtained. This characteristic is even more emphasised when metallocene catalysts are used. The breadth of the molecular weight distribution has an influence both on the Theological behaviour of the polymer (and hence the processability of the melt) and on the final mechanical properties of the product, and is a characteristic which is particularly important for the (co)polymers of ethylene. This problem has been addressed in WO 97/04015. According to this document, it is possible to broaden the molecular weight distribution of polymers without affecting their homogeneity by means of a gas-phase process performed in a loop reactor. The gas-phase polymerization according to WO 97/04015 is carried out in two interconnected polymerization zones to which one or more monomers are fed in the presence of a catalyst under reaction conditions and from which the polymer produced is discharged. The process is characterized in that the growing polymer particles flow through the first of said polymerization zones under fast fluidization conditions, leave said first polymerization zone and enter the second polymerization zone, through which they flow in a densified form under the action of gravity, leave the second polymerization zone arid are reintroduced into the first polymerization zone, thus establishing a circulation of polymer between the two polymerization zones.

According to the teachings of WO 97/04015, it is possible to broaden the molecular weight distribution of the polymers simply by properly balancing the gas-phase compositions and the residence times in the two polymerization zones of the gas-phase loop reactor. This is due to the fact that, while the polymer moves forward in the second polymerization zone flowing downward in a plug-flow mode, owing to the monomer consumption, it finds gas-phase compositions richer in molecular weight regulator. Consequently, the molecular weights of the forming polymer decrease along the axis of this polymerization zone. This effect is also enhanced by the temperature increase due to the polymerization reaction.

However, the process described in WO 97/04015 can provide only a limited control of the molecular weight distribution. In fact, even if hindered by the packed polymer, the diffusion of the gas within the polymerization zone in which the polymer particles flow in a densified form makes it difficult to establish substantial differences in the gas compositions at different heights of that zone. Moreover, it is not easy to achieve an effective balance of the residence times in the two different polymerization zones of the reactor.

Most importantly, WO 97/04015 gives no teaching on how to obtain homogeneous mixtures of polymeric chains having different compositions.

It would thus be desirable to improve the process of WO 97/04015 in order to be able to significantly broaden the molecular weight distribution of the obtained polymers and/or to render it suitable to the preparation of polymers endowed with broad composition distributions, while at the same time maintaining a high homogeneity level.

It has now been found that the above objectives, together with additional advantages, can be achieved by properly avoiding that the gas mixture present in the fast fluidized polymerization zone enter the densified solid flow polymerization zone.

Therefore, according to a first aspect, the present invention provides a process for the catalytic polymerization in the gas-phase carried out in at least two interconnected polymerization zones, the process comprising feeding one or more monomers to said polymerization zones in the presence of catalyst under reaction conditions and collecting the polymer product from said polymerization zones, in which process the growing polymer particles flow upward through one of said polymerization zones (riser) under fast fluidization conditions, leave said riser and enter another polymerization zone (downcomer) through which they flow downward under the action of gravity, leave said downcomer and are reintroduced into the riser, thus establishing a circulation of polymer between the riser and the downcomer, the process being further characterized in that:

(i) means are provided which are capable of totally or partially preventing the gas mixture present in the riser from entering the downcomer, and (ii) a gas and/or liquid mixture having a composition different from the gas mixture present in the riser is introduced into the downcomer.

According to a particularly advantageous embodiment of the present invention, the introduction into the downcomer of the said gas and/or liquid mixture having a composition different from the gas mixture present in the riser is effective in preventing the latter mixture from entering the downcomer.

As it is known, the state of fast fluidization is obtained when the velocity of the fluidizing gas is higher than the transport velocity, and it is characterized in that the pressure gradient along the direction of transport is a monotone function of the quantity of injected solid, for equal flow rate and density of the fluidizing gas. Contrary to the present invention, in the fluidized-bed technology of the known state of the art, the fluidizing-gas velocity is maintained well below the transport velocity, in order to avoid phenomena of solids entrainment and particle carryover. The terms "transport velocity" and "fast fluidization state" are well known in the art; for a definition thereof, see, for example, "D. Geldart, Gas Fluidization Technology, page 155 et seq., J. Wiley & Sons Ltd., 1986".

Generally, in the downcomer the growing polymer particles flow downward in a more or less densified form. Thus, high values of density of the solid can be reached (density of the solid =kg of polymer per $m^3$ of reactor occupied by polymer), which can approach the bulk density of the polymer. A positive gain in pressure can thus be obtained along the direction of flow, so that it becomes possible to reintroduce the polymer into the riser without the help of special mechanical means. In this way, a "loop" circulation is set up, which is defined by the balance of pressures between the two polymerization zones and by the head losses introduced into the system.

The gas mixtures involved in the process of the invention can contain entrained droplets of liquid composed of liquefied gas, as it is customary when operating in the so-called "condensing mode". Generally, in the following description it is intended that a gas phase or a gas mixture can contain a part of entrained liquid.

According to a preferred embodiment of the invention, the introduction of the gas and/or liquid mixture of different composition into the downcomer is such to establish a net gas flow upward at the upper limit of the downcomer. The established flow of gas upward has the effect of preventing the gas mixture present in the riser from entering the downcomer.

Conveniently, the gas mixture coming from the riser is prevented from entering the downcomer by introducing the gas and/or liquid mixture of different composition through one or more introduction lines placed into the downcomer, preferably at a point close to the upper limit of the volume occupied by the densified solid. The flow ratio of the gas introduced and the downward velocity of the solid must be regulated so that a net flow of gas flowing upward is established at the upper limit of the zone into which the gas coming from the riser must not enter.

The gas and/or liquid mixture of different composition to be fed into the downcomer can optionally be fed in partially or totally liquefied form. The liquefied gas mixture can also be sprinkled over the upper surface of the bed of densified polymer particles; the evaporation of the liquid in the polymerization zone will provide the required gas flow.

The present invention is described with reference to the attached figures, which are given for illustrative purpose and not to limit the invention.

BRIEF DESCRIPTION OF THE DRAWINGS

Referring to FIG. 1, the growing polymer flows through a first polymerization zone represented by the riser 1 under fast fluidization conditions along the direction of the arrow 14. In the second polymerization zone represented by the downcomer 2 the growing polymer flows in a densified form under the action of gravity along the direction of the arrow 14'. The two polymerization zones 1 and 2 are appropriately interconnected by the sections 3 and 5. The material balance is maintained by feeding in monomers and catalysts and discharging polymer.

Figure 1:
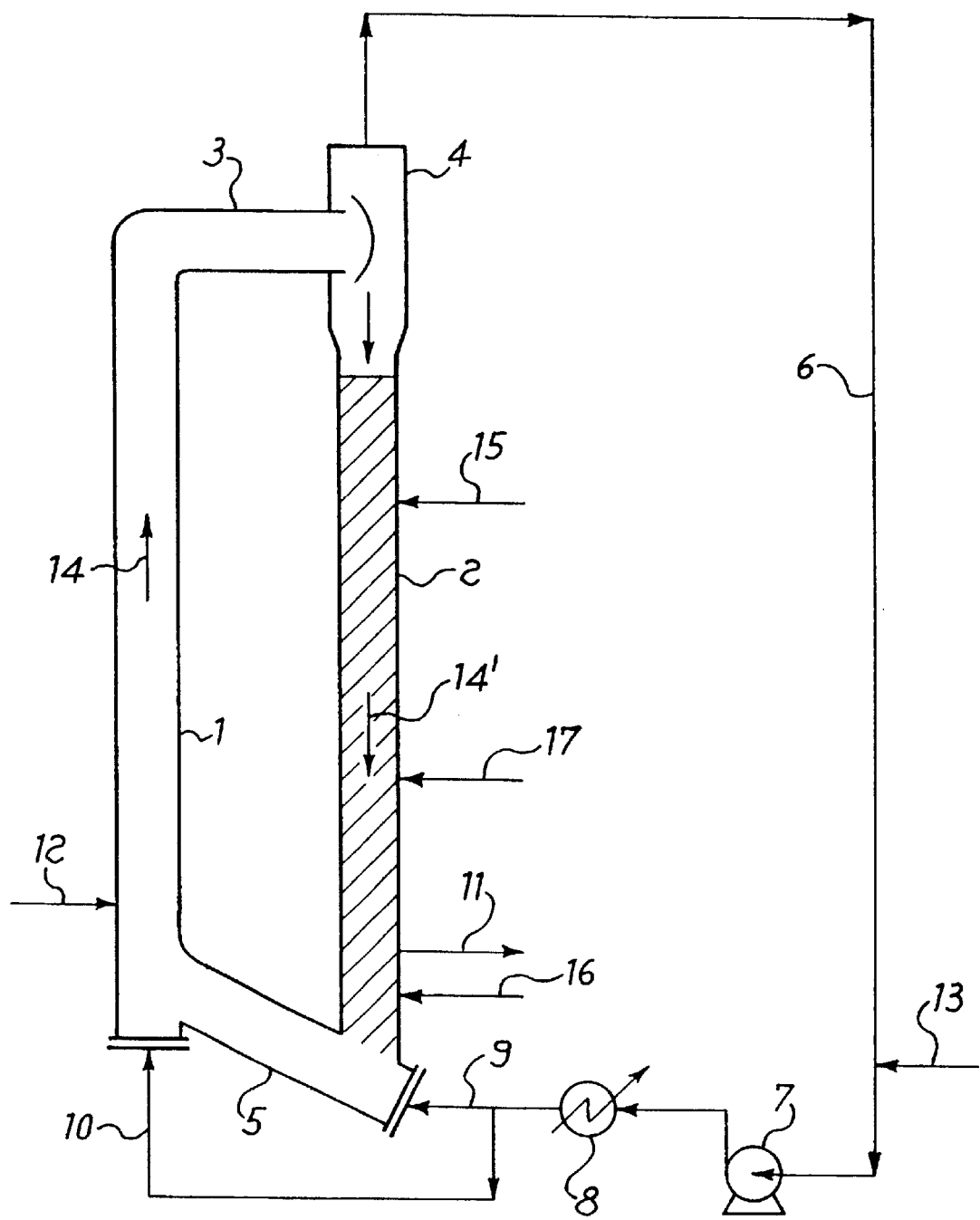
FIG. 1 is a diagrammatic representation of a reactor to carry out the process according to the invention.

Generally, the condition of fast fluidization in the riser 1 is established by the gas mixture comprising one or more components coming from section 5, which is fed through a line 9, that permits also the transfer of the polymer from the downcomer 2 to the riser 1. Part of the gaseous mixture can be fed to the riser 1 through a line 10 placed below the point of reintroduction of the polymer into the riser 1. The line 10 can be endowed, where appropriate, with gas distributor means such as, for example, a distributor grid. The velocity of the transport gas injected into the riser 1 has to be higher than the transport velocity under the operating conditions, and depends on the gas density and the particle size distribution of the solid. It is preferably comprised between 0.5 and 15 m/s, more preferably between 0.8 and 5 m/s.

The control of the polymer circulating between the two polymerization zones can be effected by metering the amount of polymer leaving the downcomer 2. This can be done by using means suitable for controlling the flow of solids such as, for example, mechanical valves (slide valve, butterfly valve, V-ball valve, etc.) or non-mechanical valves (L valve, J valve, reverse seal, etc.). The interconnection section 5 can be horizontal or inclined. A grid can be provided placed substantially longitudinally in the section 5 and separating the bottom part of the said section from the upper part where the solid flows: at least part of the recycle gas is introduced below the grid thus allowing a certain fluidization of the solid in the section 5 to facilitate flow.

The polymer and the gaseous mixture leaving the riser 1 are conveyed to a solid/gas separation zone 4. The solid/gas separation can be effected by using conventional separation means such as, for example, a separator of the inertial type or of the centrifugal type, or a combination of the two. The centrifugal separator (cyclone) can be of the axial, spiral, helical or tangential type. It may be important to avoid a too big pressure drop in the solids separation zone 4 in order to have a sufficient pressure at the bottom of the downcomer 2, which avoids possible reflux of the gas stream. Therefore, separators are particularly preferred that do not present a strong resistance to the gas flow, such as axial flow cyclones, settling chambers; to this regard, it can be noted that the presence of fines in the recycle line 6 can be, to some extent, tolerated. Accordingly, section 3 can be a circular connection ending into an axial flow cyclone, thus avoiding sharp bends of the flow pattern at the exit of the riser 19 and at the entrance into the downcomer 2.

From the separation zone 4, the polymer enters the downcomer 2. The gaseous mixture leaving the separation zone 4 is compressed, cooled and transferred, if appropriate with addition of make-up monomers and/or molecular weight regulators and/or inert gases, to the riser 1 via the line 9. This transfer is effected by means of a recycle line 6 for the gaseous mixture, equipped with means for the compression 7 and cooling 8 and a line 13 for feeding monomers, molecular weight regulators and, optionally, inert gases. A part of the gaseous mixture leaving the separation zone 4 can be transferred, after having been compressed and cooled, to the bottom of the riser 1 through the line 10. Almost all of the gas sent to the riser 1 can be introduced through line 10, while a smaller amount needed to regulate the flow of polymer coming from the downcomer and to transport it through section 5 can be introduced through the line 9. Due to this function, it may be preferred that the gas sent through the line 9 does not contain condensed components: in this case, the means 8 for cooling should be placed on line 10.

Means for cooling the reaction gases can be placed at any suitable point, according to the knowledge of the skilled in art. For example, a jacket heat exchanger can be placed around any of the polymerization zones to better control the temperature profile therein. Generally, the various catalyst components are fed to the riser 1 through a line 12 that is preferably placed in the lower part of the riser 1. However, they can be fed at any other point of the riser 1, as well as at any point of the downcomer 2 or of the interconnecting sections 3 and 5.

The polymer can be discharged through a line 11 advantageously placed in the downcomer 2, where the polymer particles flow in a more packed form, so to minimise the quantity of entrained gas. By inserting a controlled valve at a suitable point upstream of the exit region of the polymer from the downcomer, it becomes possible to continuously control the withdrawal of the polymer produced. The amount of gas accompanying the discharged polymer is extremely small and only slightly greater than what can be achieved by interposing a series of hoppers in alternating intermittent operation.

According to the present invention, the gas mixture that is separated from the circulating solid in the separation zone 4 must be prevented to enter the downcomer 2. According to a particularly advantageous embodiment of the present invention, this can be achieved by feeding a gas and/or liquid into the downcomer 2 through a line 15 placed at a suitable point of said downcomer 2, preferably in the upper part thereof. The gas and/or liquid mixture to be fed into the downcomer 2 should have an appropriate composition, different from that of the gas mixture present in the riser 1. The said gas and/or liquid mixture partially or totally replaces the gas mixture entrained with the polymer particles entering the downcomer. The flow rate of this gas feed can be regulated so that a flow of gas counter-current to the flow of polymer particles is originated in the downcomer 2, particularly at the top thereof, thus acting as a barrier to the gas mixture coming from the riser 1 which is entrained among the polymer particles.

It is also possible to place several feed lines 17 in the downcomer 2 at different heights, in order to better control the gas-phase composition throughout said downcomer. The composition of the gas and/or liquid introduced through those feed lines can be the same or differ from that of the stream introduced in 15. These additional feed lines, as well as line 15, can be used to introduce condensed monomers or inert components. Their evaporation in the downcomer 2 contributes to remove the heat of reaction, thus allowing to control the temperature profile in the downcomer 2 in a reliable way.

The temperature profile in the downcomer 2 can be also controlled by means of a cooling jacket placed around its external wall. The downcomer 2 can also be shaped as a tube bundle, in order to better release heat to the outside.

In order to control the solids recirculation between the two zones, and to provide greater resistance to backward gas flow in the section where the downcomer 2 leads into the connecting section 5, the section of the bottom of the downcomer 2 can be conveniently restricted, for example being shaped like a funnel. Advantageously, adjustable mechanical valves can be employed, such as, for example, a throttle valve, such as a butterfly valve. Another suitable device is the so-called "pinch valve", which reduces the possibility of clogging of the reactor's section. This valve consists in a flexible membrane adapted to the reactor's wall, so that, when introducing a gas into the space between the wall and the membrane, the latter restricts the section of the reactor to the desired extent.

In order to better control the polymer's flow through the bottom of the downcomer 2, it may be advantageous to introduce a gas stream ("dosing gas") into the lower part of the downcomer 2, at a point just above the section where the downcomer 2 leads into section 5 through an appropriated line 16. This means that this gas stream is introduced above the restriction as above described, if this is foreseen. The presence of both the restriction and the said gas stream is particularly advantageous for the control of the process, in particular of the flow of recirculated polymer and the pressure in the terminal section of the downcomer 2. The gas to be introduced through line 16 may be taken from the recycle line 6, preferably upstream the cooling means 8, likewise the gas to be introduced through line 9. Then it may be necessary that the flow of the polymer in the downcomer and of the gas introduced through lines 9 and/or 16, particularly 16, be regulated in order to avoid that this dosing gas flow upwards into the downcomer 2.

Various methods can be used to increase the density of the polymer suspended in the riser 1, in order to increase the residence time of the growing particles therein. Thus a better utilisation of the reactor's volume, besides the regulation of the relative amounts of the polymer produced in the riser 1 and the polymer produced in the downcomer 2, is possible. For example the exit of the riser 1 can be shaped as a sudden restriction and the connecting section 3 can have a smaller diameter than the riser 1, or the riser 1 and the section 3 can form a sharp angle.

A part of the riser 1 can have a larger diameter, than that which allows a gas flow velocity capable to cause fast fluidisation. Thus this section behaves as a conventional fluidized bed, and the hold-up of the solid is considerably increased.

According to another embodiment of the process of the invention, it is provided more than one polymerization zone, through which the growing polymer particles flow downward under the action of gravity (downcomers), and the gas mixture arriving from the riser is prevented to enter only into some of the downcomers, while in the other downcomer(s) the circulation of said gas mixture is permitted. By properly regulating the level in the downcomers, it is possible to adjust the relative residence times of the growing polymer particles in zones in which different polymers are formed, according to the characteristics of the target products. In fact, since this level regulation is more easily achieved in the downcomers wherein the circulation of the gas mixture arriving from the riser is permitted, this embodiment allows more operational flexibility.

Figure 2:
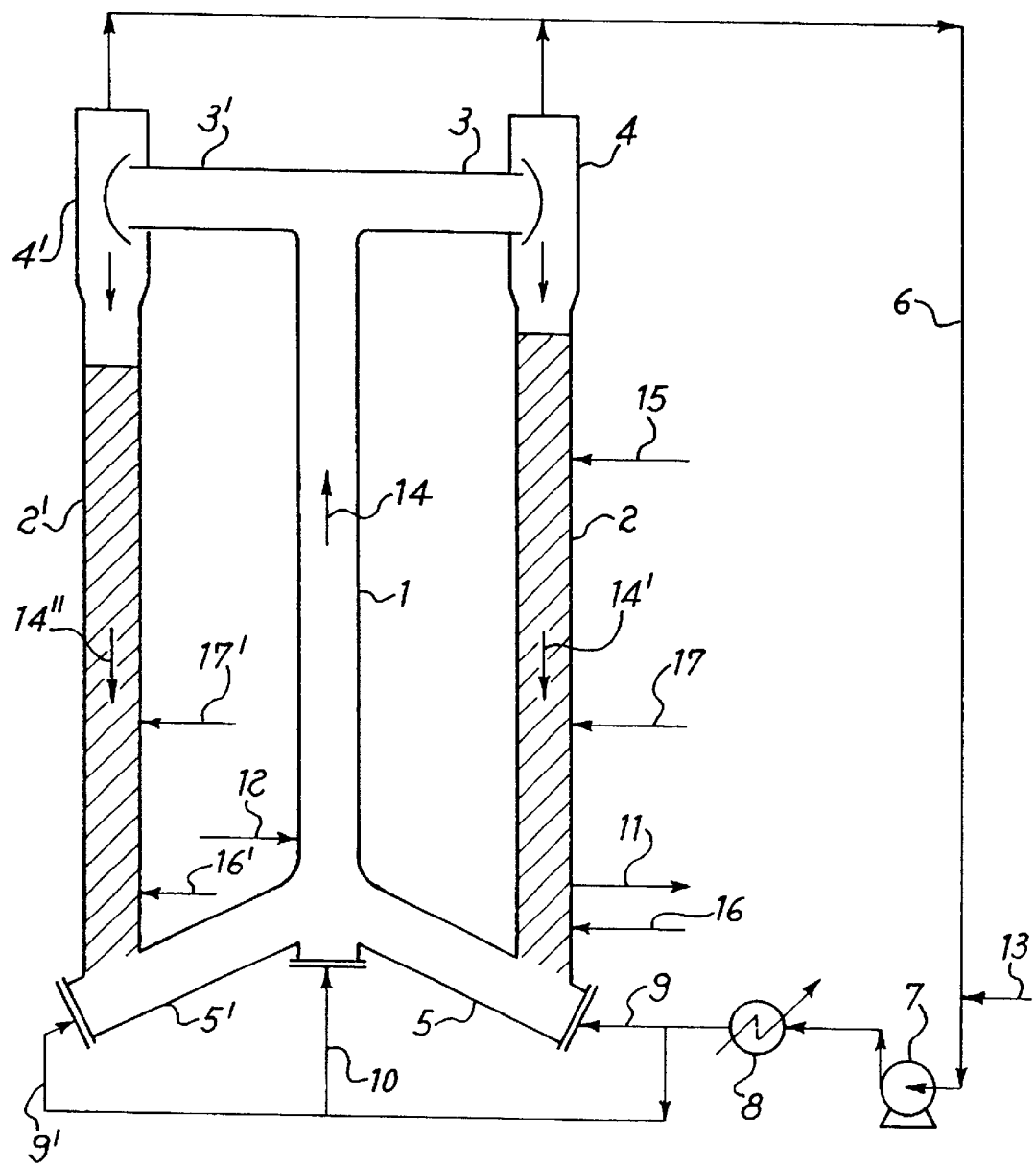
FIG. 2 is a diagrammatic representation of an embodiment of a reactor to carry out the process according to the invention.

The above-described embodiment is illustrated in FIG. 2. With reference to this figure, the stream of gas with entrained solid coming from the riser 1 is split in two parts and sent to the solid/gas separators 4 and 4'. The gas separated in both separators is sent to a recycle line 6, compressed in a blower 7, cooled in a heat exchanger 8 and reintroduced into the interconnecting sections 5 and 5' through lines 9 and 9' and, optionally, also at the bottom of the riser 1 through line 10. The solid separated in the separation zones 4 and 4' fall into the downcomers 2 and 2' where they flow downward in densified form under the action of gravity. A feed line 15 introduces into the downcomer 2 a stream of gas of composition different from that present in the riser 1, while the gas mixture present in the downcomer 2' is constituted by gas coming from the riser 1 and entrained among the polymer particles flowing in densified form. Make up monomers and other reactants can be fed through line 13.

Figure 3:
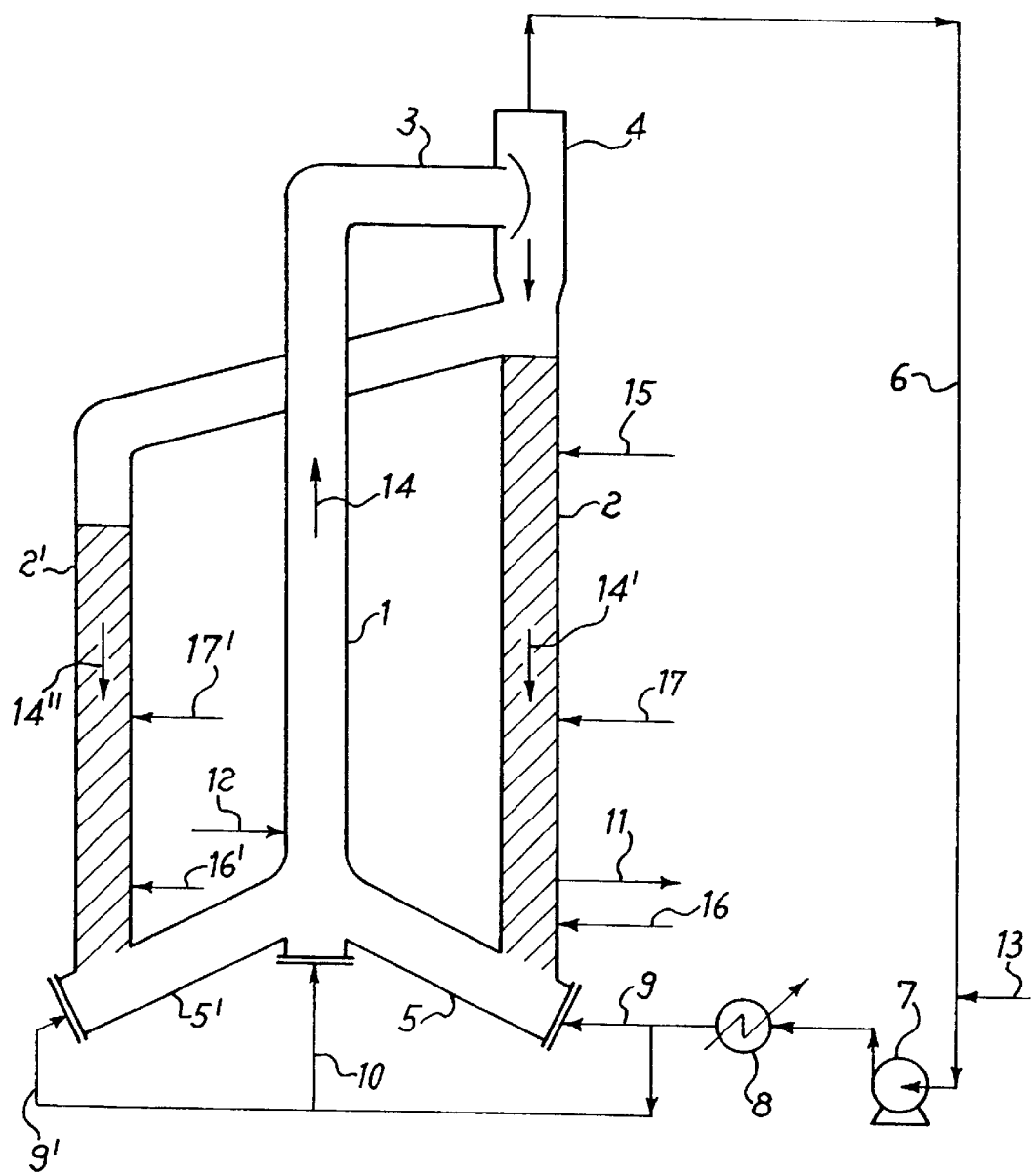
FIG. 3 is a diagrammatic representation of another embodiment of a reactor to carry out the process according to the invention.

Another example of the above-described embodiment is illustrated in FIG. 3. With reference to this figure, the gas stream coming from the riser 1 is sent to the gas/solid separator 4. The separated solid falls partly into the downcomer 2 and the solid exceeding the solid flow rate established in the downcomer 2 overflows into the downcomer 2'. Therefore, the level of solid in the downcomer 2 is kept constant by the overflow accommodation, while the level in the downcomer 2' is adjusted with one of the methods described above. A line 15 for feeding gas is provided into the downcomer 2 to prevent gases coming from the riser 1 from entering that zone. The gas separated in the gas/solid separator 4 is recycled on top on the reactor as described with reference with the other figures.

Any possible combination of risers and downcomers is intended as comprised within the spirit of the process of the invention.

It is possible that the amount of gas and/or liquid (barrier stream) that is needed to prevent the gas mixture entrained with the solid particles leaving the gas/solid separator from entering the downcomer is larger than the amount of the component(s) that is needed as make-up stream. Therefore it may be necessary that part of the gas stream separated from the solid in the gas/solid separator 4 (reference is made to FIG. 1) is fed through line 15 as barrier stream, after removal or sufficient reduction of the component(s) which must be prevented from entering the downcomer 2.

Figure 4:
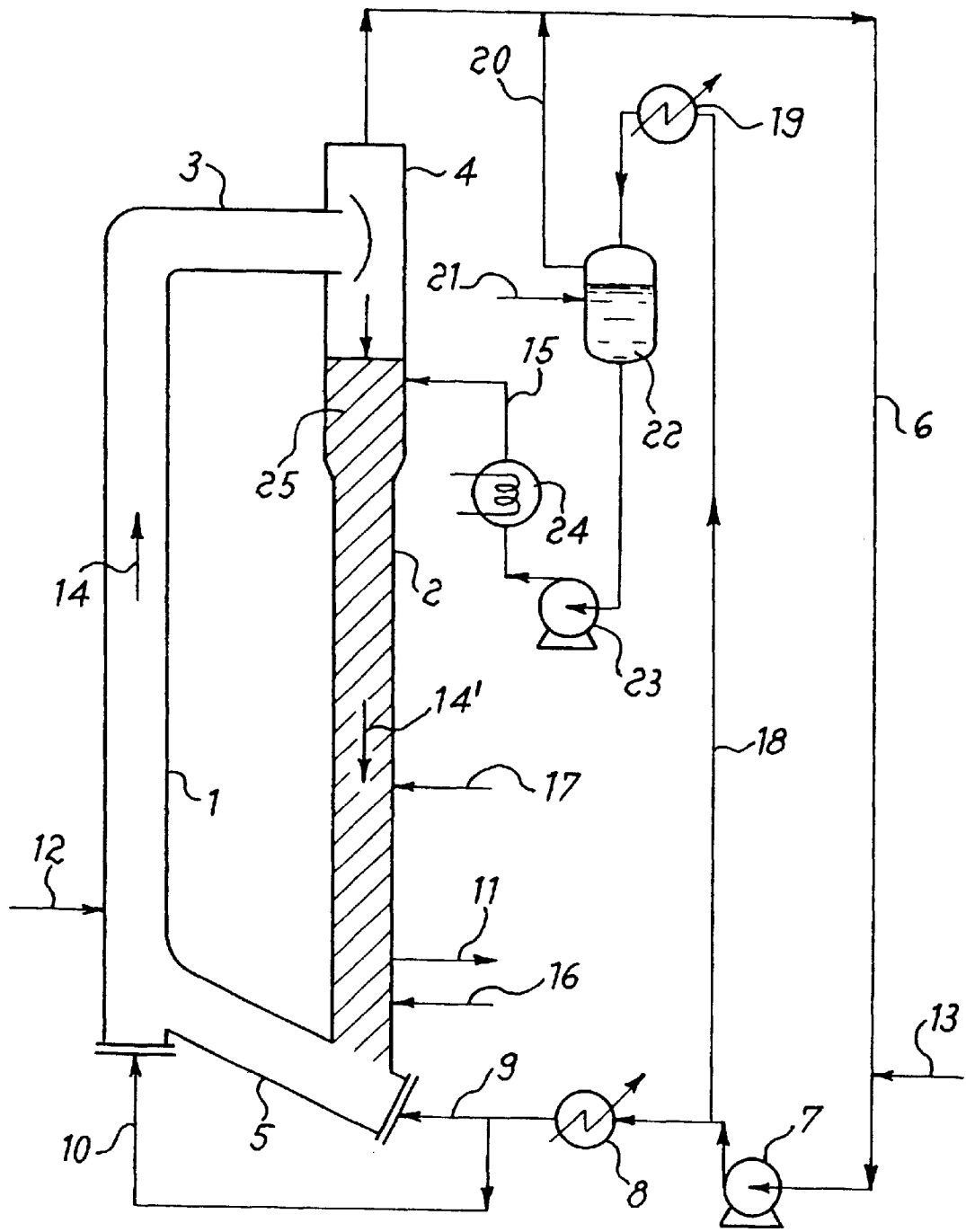
FIG. 4 is a diagrammatic representation of a further embodiment of a reactor to carry out the process according to the invention.

In FIG. 4 it is shown a process scheme that is particularly advantageous to be employed when the volatility of the components which must be fed as barrier stream (through line 15) and of those which must be prevented from entering the downcomer 2 is sensibly different; more precisely, when the latter are the most volatile. This scheme is particularly suitable when the process of the invention is used to produce broad molecular weight olefin polymers and hydrogen is used as molecular weight regulator in the riser 1.

After the hydrogen containing recycle stream of line 6 has been compressed, a part thereof is sent through line 18 to a condenser 19, where it is cooled to a temperature at which the monomer(s) and the optional inert hydrocarbon component(s) condense. The solubility of the hydrogen in the liquid is then low enough that the liquid obtained is suitable to be fed through line 15 into the upper part of the downcomer 2 as previously described. A separating vessel 22 is also preferably present downstream of the condenser 19. The separated gaseous mixture rich in hydrogen is advantageously recirculated through line 20 to the recycle line 6. When this particular scheme is adopted, the make-up components that must be present in the downcomer 2 may be fed at any suitable point directly into line 15. A suitable point of introduction for components in the liquid state is directly into the vessel 22, through line 21. The liquid can be fed into the downcomer by gravity by placing vessel 22 at a convenient height or by any suitable means, such as a pump 23.

According to a preferred embodiment, particularly indicated when this particular scheme is adopted, the upper part 25 of the downcomer 2 acts as a stripping column to further remove the volatile component, e.g. hydrogen, from the gas stream flowing through the downcomer 2. The barrier stream is fed through line 15 in the liquid state. The heat necessary for the stripping process is continuously supplied by the polymer particles, coming from the separator 4, since they develop their heat of polymerization. It is apparent that the temperature of the polymer particles must be above the boiling point of the liquid fed through line 15. A way to achieve this is to operate at a temperature high enough in the riser 1. By a careful balance of the flow of the solid through this section and the liquid feed through line 15, the hydrogen rich gas evaporated is made to flow upwards (towards separator 4, where it will be sent to line 6); the hydrogen content of the liquid flowing downwards decreases as it goes down to the lower section, as it happens in a normal packed-bed distillation column. The liquid mixture, made sufficiently hydrogen-free, flows with the solid particles into the downcomer 2, where it gradually evaporates.

A heater 24 can also be foreseen on line 15 to provoke a partial evaporation of the liquid to be fed into the downcomer, so that an hydrogen-rich gas is already generated to facilitate its removal and the successive fractionation. Any suitable combination of heaters, condensers and fractionating devices on line 15 clearly falls within the spirit of the present invention. The liquid or gas-liquid mixture can be fed into the upper part 25 of the downcomer 2 by any suitable device. For example it can be sprayed above the top of the packed-bed present in section 25, or introduced by one or more pipes protruding into the said section.

In order to assure that section 25 is not fluidized, but behaves like a packed-bed liquid-drowned column, it has preferably a bigger diameter than the rest of the downcomer 2. Its lower part can be funnel-shaped.

The embodiments described in FIG. 4 are also suited for other processes than the production of broad MWD polymers by use of hydrogen. It can be used, for instance, to produce blends of a propylene homopolymer and a random copolymer of propylene with ethylene. In this case, the same scheme applies, with ethylene being the volatile component, so that the homopolymer is produced in the downcomer. This scheme can also be applied when a heavier component must be present in higher concentration in the downcomer; for example, when a propylene homopolymer or copolymer with low 1-butene content must be prepared in the riser and a propylene copolymer with higher 1-butene content must be prepared in the downcomer. In particular, the upper part 25 of the downcomer 2 can be used as a 1-butene enrichment section for the liquid mixture that flows downward to the downcomer.

Another example of application of this embodiment is when ethylene is (co)polymerized in the presence of a less volatile inert, such as propane, which can be condensed at the operating pressure and utilised as barrier fluid, to prevent hydrogen from entering the downcomer. In this case ethylene can be reintroduced directly into the downcomer in different positions.

The process of the present invention can be combined with conventional polymerization technologies (in bulk or in the gas-phase, either in a fluidised-bed or in a stirred bed), to give rise to any possible sequential or interposed multi-stage process.

When two or more downcomers are provided, it is possible to feed to different downcomers gas mixtures having compositions different among them and also different from the composition of the gas mixture present in the riser.

Further, in the present process it is intended that each of the polymerization zones can be constituted by one or more reactors.

Since fines can be tolerated in the recycle stream 6 to be fed to the riser, but can disturb the operations if they are fed into transport section 5 or into the downcomer through line 16 or to the condenser 19, the gas separated from line 6 to feed lines 9, 16 and 18 can conveniently be treated in a fines separator of any suitable kind. The fines can be recirculated into line 6, or sent along with the gas stream fed to the riser through line 10.

Any type of suitable catalyst can be used in the process of the present invention, since it is not important for it to be in any particular physical state, and catalysts in either solid or liquid form can be used. In fact, in contrast to the conventional fluidized-bed gas-phase processes, the process of the present invention does not necessarily require the use of catalysts in which at least one component is in a granular form, but can be carried out with catalysts in which the various components are in solution. For example, catalysts for the polymerization of olefins based on titanium, chromium, vanadium or zirconium can be used either in supported or unsupported form. Examples of catalysts that can be used are described in the patents U.S. Pat. No. 4,748,272, U.S. Pat. No. 4,302,566, U.S. Pat. No. 4,472,520 and U.S. Pat. No. 4,218,339. Particularly suitable are the catalysts of controlled morphology, which are described in the patents U.S. Pat. No. 4,399,054, U.S. Pat. No. 5,139,985, EP-395,083, EP-553,805, EP-553,806 and EP-601,525, and in general catalysts capable of giving polymers in the form of spheroidal particles having a mean dimension between 0.2 and 5 mm, preferably between 0.5 and 3 mm. The process of the present invention is particularly suitable for the use of metallocene catalysts, either in solution or supported. The various catalyst components can be introduced at the same point or at different points of the riser and/or of the downcomer. The catalyst can be fed in either without prior treatment or in a prepolymerized form. In case other polymerization stages are situated upstream, it is also possible to feed the polymerization zones with a catalyst dispersed in a polymer suspension coming from an upstream bulk reactor, or a catalyst dispersed in a dry polymer coming from an upstream gas-phase reactor. If a catalyst in solution is employed, it is advantageous to feed the solution into the downcomer. In this case it is necessary to feed also a solid support in form of particles, for instance prepolymer particles. The solid support particles are preferably fed into the riser. The polymer concentration in the reactive zones can be monitored by the usual methods known in the state of the art, for example by measuring the differential pressure between two suitable points along the axis of the polymerization zones or measuring the density by nuclear detectors (for example $\gamma$-rays).

The operating parameters such as, for example, temperature and pressure, are those that are usual in gas-phase catalytic polymerization processes. For example, the temperature in gas-phase processes for the polymerization of olefins is generally comprised between 50° C. and 120° C.

The process of the present invention can advantageously be used for the preparation of a large number of olefin polymers without the disadvantages described above. Examples of polymers that can be obtained are:

high-density polyethylenes (HDPEs having relative densities higher than 0.940) including ethylene homopolymers and ethylene copolymers with $_\alpha$-olefins having 3 to 12 carbon atoms;

linear polyethylenes of low density (LLDPEs having relative densities lower than 0.940) and of very low density and ultra low density (VLDPEs and ULDPEs having relative densities lower than 0.920 down to 0.880) consisting of ethylene copolymers with one or more $_\alpha$-olefins having 3 to 12 carbon atoms;

elastomeric terpolymers of ethylene and propylene with minor proportions of diene or elastomeric copolymers of ethylene and propylene with a content of units derived from ethylene of between about 30 and 70% by weight;

isotactic polypropylene and crystalline copolymers of propylene and ethylene and/or other $_\alpha$-olefins having a content of units derived from propylene of more than 85% by weight;

isotactic copolymers of propylene and $_\alpha$-olefins, such as 1-butene, with an $_\alpha$-olefin content of up to 30% by weight;

impact-resistant propylene polymers obtained by sequential polymerization of propylene and mixtures of propylene with ethylene containing up to 30% by weight of ethylene;

atactic polypropylene and amorphous copolymers of propylene and ethylene and/or other $_\alpha$-olefins containing more than 70% by weight of units derived from propylene;

polybutadiene and other polydiene rubbers.

If broad molecular weight distribution polymers are targeted, a molecular weight regulator, such as hydrogen, can be fed into the riser to obtain low molecular weight chains. The molecular weight regulator should be prevented from entering the downcomer (or allowed therein only in a much lower concentration). This can be achieved, according to the invention, by feeding into the downcomer a gas mixture free of the molecular weight regulator consisting, for instance, of monomers and inert gases. By maintaining the downcomer substantially free of molecular weight regulator, polymeric chains will be formed in the two zones with considerably different molecular weights. The fast circulation of the solid between the different polymerization zones allows obtaining a high homogeneity of the product. This is an important feature, particularly when the polymer is used for certain applications, such as the production of films.

A particularly interesting use of the presently claimed process is for the preparation of in-reactor made blends of polymers having different compositions. In fact, if the gas mixture introduced into the downcomer contains different monomer concentrations and/or types with respect to the gas-mixture present in the riser, the product will be an intimate blend of polymer chains having different compositions.

It may be found advantageous that the gas mixture present in the riser be only partially prevented from entering the downcomer. An example of application of this embodiment is the preparation of a blend of copolymers with different concentrations of the same comonomer in the two polymerisation zones. By feeding a mixture free of the said comonomer into the downcomer, the concentration of that comonomer therein will be lower than that in the riser. Thus a blend of two different copolymers will be obtained.

Advantageously, one or more inert gases are maintained in the polymerisation zones, in such quantities that the sum of the partial pressures of the inert gases is preferably between 5 and 80% of the total pressure of the gases. The inert gas can be nitrogen or an aliphatic hydrocarbon having 2–6 carbon atoms, preferably propane. The presence of the inert gas has numerous advantages. It makes it possible to moderate the reaction kinetics while at the same time maintaining total reaction pressures sufficient to keep low the head of the circulation compressor. This assures an adequate mass flow rate for the heat exchange on the particle in the bed and, through the cooler on the circulating gaseous mixture, for the removal of the heat of reaction that has not been removed by the surfaces. Another advantage of the presence of the inert gas is that it allows limiting the temperature increase in the downcomer, which runs in an essentially adiabatic mode.

It must be also noted that by using an apparatus in which the solid continuously circulates and, in particular, is continuously transported as it happens both in the riser and in the downcomer, heat removal efficiency can be higher than in a conventional fluidized bed. This permits to have a higher specific productivity than that obtainable in a conventional fluidised bed.

The present invention also relates to an apparatus for the gas-phase catalytic polymerization comprising a first vertical, preferably cylindrical, reactor 1, a second vertical, preferably cylindrical, reactor 2; the upper region of said reactor 1 being connected by a connecting part 3 (i.e. a pipe) to a solid gas separator 4, which is in turn connected to the upper region of said second reactor 2; the lower region of said second reactor 2 being connected to the lower region of said first reactor 1 by a connecting part 5; said solid/gas separator 4 being connected through a recycle line 6 to one ore more points of reintroduction into said connecting part 5 or into said reactor 1; said apparatus having a line 12 for feeding a catalyst into said reactor 1; a polymer discharge system 11 from said reactor 2; a line 13 for feeding monomers; the said apparatus being further characterized in that it comprises a line 15 for feeding gas or liquid into said reactor 2, preferably placed in the upper part of said reactor 2. According to a preferred embodiment the apparatus also comprises a line 18 connecting line 6 to a condenser 19, which is connected via line 15 to the reactor 2 and also comprises a recycle line 20 for not condensed components back to the recycle line 6.

Preferably the line 15 is also provided with a vessel 22 and line 20 connects the upper part of the said vessel to line 6. The line 15 may also be provided with a heater 24.

According to a further embodiment, the exit from the riser 1 is shaped as a sudden restriction, or the section 3, connecting the riser 1 to the separator 4, has a smaller diameter than the riser 1, or the riser 1 and the section 3 form a sharp angle.

In order to provide a better understanding of the invention the following examples are reported which are given for illustrative purposes only and shall not be construed as limitative of the invention.

EXAMPLES

Characterisations

The properties stated were determined according to the following methods:

Melt index E (MIE): ASTM-D 1238 method E.

Melt index F (MIF): ASTM-D 1238 method F.

Melt index L (MIL): ASTM-D 1238 method L.

Ratio of degrees (F/E): ratio between melt index E and melt index F.

Density: ASTM-D 792.

Flexural elasticity modulus (MEF): the samples were nucleated with talc 0.85 wt. % in examples 1 to 34; with "Millad 3988" 0.16 wt. % in example 44; not nucleated in example 45; the tests were carried out according to ASTM D-790.

Hardness "shore D": ISO 868.

Insolubility index: in xylene at 25° C.

Intrinsic viscosity (I.V.): in tetrahydronaphtalene at 135° C.

The differential scanning calorimetry (DSC) measurements have been carried out on a DSC-7 apparatus of Perkin Elmer Co. Ltd., according to the following procedure. About 10 mg of sample are heated to 180° C. with a scanning speed equal to 10° C./minute; the sample is kept at 180° C. for 5 minutes and thereafter is cooled with a scanning speed equal to 10° C./minute.

A second scanning is then carried out, according to the same modalities as the first one. The values reported are those obtained in the second scanning.

Polydispersity index (P.I.): this property is strictly connected with the molecular weight distribution of the polymer under examination. In particular it is inversely proportional to the creep resistance of the polymer in the molten state. Said resistance, called modulus separation at low modulus value, i.e. 500 Pa, was determined at a temperature of 200° C. by using a parallel plates rheometer model RMS-800 marketed by RHEOMETRICS (USA), operating at an oscillation frequency which increases from 0.1 rad/s to 100 rad/s. from the modulus separation value, one can derive the P.I. by way of the equation:

$$P.I.=54.6*(modulus\ separation)^{-1.76}$$

In which the modulus separation is defined as:

Modulus separation =frequency at G'=500Pa/frequency at G"=500Pa

Wherein G' is the storage modulus and G" is the low modulus.

General Procedure

Polymerisations were carried out under continuous conditions in a plant comprising a gas phase polymerization apparatus of the kind shown in FIG. 1.

The catalyst was sent to the gas phase polymerization apparatus. The latter comprised two cylindrical reactors, riser 1 and downcomer 2, interconnected by sections 3 and 5. Fast fluidization conditions were established in reactor 1 by recycling gas from the gas-solid separator 4 through recycle line 6 (equipped with a compressor 7 and a heat exchanger 8) to a point 9 at the beginning of section 5 and optionally, partly through line 10 to the bottom of reactor 1. The catalyst, prepolymerized with propylene, was introduced through line 12. Make-up monomers and hydrogen as molecular weight regulator were fed through line 13. A gas stream (barrier feed) was fed to the reactor through line 15 in the operative examples, with the exception of the comparison examples, where such barrier feed was not present. The produced polymer was continuously discharged through line 11. The flow of polymer exiting the downcomer 2 was controlled by a Q ball valve operated by a gas stream taken from recycle stream 9.

Unless otherwise specified the "barrier feed" is intended in the gas state. The quantity of polymer recirculated in the apparatus during the tests was comprised between 500 and 5,000 Kg/h.

Examples 1 to 11

Polymerization of Propylene

An apparatus as described above was utilized to polymerize propylene. Both riser and downcomer had a nominal diameter DN 100. The catalyst employed comprised a catalyst component prepared with the procedure described in EP A 728 769, example 1, and triethylaluminium (TEAL) in a molar ratio TEAL/Ti of 280. The recirculated gas was completely reintroduced through line 9. The temperature throughout the reactor was kept at about 80° C. and the pressure at about 30 bar. Other operative conditions and the characteristics of the produced polymer are indicated in Table 1.

Examples 12 to 19

Polymerization of Propylene

An apparatus as described above was utilized to polymerize propylene. Both riser and downcomer had a nominal diameter DN 100. The catalyst employed comprised a catalyst component prepared as described in EP A 728 769, example 5, lines 46 to 53. Such catalyst component was used with dicyclopentyldimethoxysilane as external donor and with triethylaluminium (TEAL). The molar ratio TEAL/Ti was 280; the molar ratio TEAL/external donor was 8. The recirculated gas was completely reintroduced through line 9. The temperature throughout the reactor was kept at about 80° C. and the pressure at about 30 bar. Other operative conditions and the characteristics of the produced polymer are indicated in Table 1.

Examples 20 to 25

Polymerization of Propylene

An apparatus as described above was utilized to polymerize propylene. The riser had a nominal diameter DN 150, the downcomer had a nominal diameter DN 100. The catalyst employed was prepared as described above for examples 12 to 19. The recirculated gas was reintroduced through line 10 except a minor amount recirculated through line 9 to carry the circulating polymer through section 5. The temperature throughout the reactor was kept at about 80° C. and the pressure at about 32 bar. Other operative conditions and the characteristics of the produced polymer are indicated in Table 1.

Examples 26 to 34

Polymerization of Propylene

An apparatus as described above was utilized to polymerize propylene. The riser had a nominal diameter DN 200, the downcomer had a nominal diameter DN 100. The catalyst employed was prepared as described above for examples 12 to 19. The recirculated gas was reintroduced through line 10 except a minor amount recirculated through line 9 to carry the circulating polymer through section 5. The temperature throughout the reactor was kept at about 85° C. and the pressure at about 30 bar. Other operative conditions and the characteristics of the produced polymer are indicated in Table 1.

Examples 35 to 38

Homo- and Copolymerization of Ethylene

An apparatus as described above was utilised to polymerize ethylene and to copolymerize ethylene with butene. Both riser and downcomer had a nominal diameter DN 100. The catalyst employed was prepared as described above for examples 1 to 11. The recirculated gas was reintroduced through line 10 except a minor amount recirculated through line 9 to carry the circulating polymer through section 5. Make-up ethylene was fed through line 13 except a minor amount fed directly into the downcomer. The temperature throughout the reactor was kept at about 85° C. and the pressure at about 25 bar. Other operative conditions and the characteristics of the produced polymer are indicated in Table 2.

Example 39

Preparation of a Blend of Propylene Homopolymer and Ethylene Modified Polypropylene An apparatus as described above was utilised to polymerize propylene and to copolymerize propylene with ethylene. The riser had a nominal diameter DN 200, the downcomer had a nominal diameter DN 100. The catalyst employed was prepared as described above for examples 12 to 19. The recirculated gas was reintroduced through line 10 except. a minor amount recirculated through line 9 to carry the circulating polymer through section 5. The temperature throughout the reactor was kept at about 80° C. and the pressure at about 30 bar. Other operative conditions and the characteristics of the produced polymer are indicated in Table 3.

Examples 40 to 42

Polymerization of Propylene

To polymerize propylene, an apparatus as described above was utilized, except for the position of the heat exchanger, which was now placed on line 10. The riser had a nominal diameter DN 200, the downcomer had a nominal diameter DN 100. The catalyst employed comprised a catalyst component prepared as described in EP A 728 769, example 5, lines 46 to 53. Such catalyst component was used with dicyclopentyldimethoxysilane as external donor and with triethylaluminium (TEAL). The molar ratio TEAL/Ti was 105; the molar ratio TEAL/external donor was 8. The recirculated gas was completely reintroduced through line 10 except a minor amount recirculated through line 9 to carry the circulating polymer through section 5. The temperature throughout the reactor was kept at about 85° C. and the pressure at about 26 bar, except in example 42 where it was kept at about 30 bar.

In order to verify the possibility of using the upper part of the downcomer 2 as a fractionating column the barrier feed was introduced prevalently in the liquid state and it contained 1% by mol. of hydrogen. In order to produce a broad MWD polymer, the hydrogen concentration in the downcomer must be very low.

Other operative conditions and the characteristics of the produced polymer are indicated in Table 4.

Example 43

Preparation of a Blend of Propylene Homopolymer and Ethylene Modified Polypropylene To prepare the above-mentioned product, an apparatus as described above was utilized, except for the position of the heat exchanger, which was now placed on line 10. The riser had a nominal diameter DN 200, the downcomer had a nominal diameter DN 100. The catalyst employed comprised a catalyst component prepared as described in EP A 728 769, example 5, lines 46 to 53. Such catalyst component was used with dicyclopentyldimethoxysilane as external donor and with triethylaluminium (TEAL). The molar ratio TEAL/Ti was 110; the molar ratio TEAL/external donor was 8. The recirculated gas was completely reintroduced through line 10 except a minor amount recirculated through line 9 to carry the circulating polymer through section 5. The temperature throughout the reactor was kept at about 85° C. and the pressure at about 30 bar.

The barrier feed was introduced into the upper part of the downcomer in the liquid state.

Other operative conditions and the characteristics of the produced polymer are indicated in Table 5.

Example 44

Preparation of a Blend of two Different Ethylene Modified Polypropylene Polymers To prepare the above-mentioned product, an apparatus as described above was utilized, except for the position of the heat exchanger, which was now placed on line 10. The riser had a nominal diameter DN 200, the downcomer had a nominal diameter DN 100. The catalyst employed comprised a catalyst component prepared as described in EP A 728 769, example 5, lines 46 to 53. Such catalyst component was used with dicyclopentyldimethoxysilane as external donor and with triethylaluminium (TEAL). The molar ratio TEAL/Ti was 105; the molar ratio TEAL/external donor was 8. The recirculated gas was completely reintroduced through line 10 except a minor amount recirculated through line 9 to carry the circulating polymer through section 5. The temperature throughout the reactor was kept at about 70° C. and the pressure at about 24 bar.

The barrier feed was introduced into the upper part of the downcomer in the liquid state. In this example the barrier feed (propylene) was regulated to allow a minor amount of the ethylene containing gas entrained with the polymer flowing into the downcomer to enter the latter. Thus a propylene copolymer was produced in the downcomer with a smaller amount of bound ethylene than that produced in the riser.

Other operative conditions and the characteristics of the produced polymer are indicated in Table 6.

Example 45

Preparation of a Blend of Propylene Homopolymer and Ethylene Modified Polypropylene "Soft Grade"

To prepare the above-mentioned product, an apparatus as described above was utilized, except for the position of the heat exchanger, which was now placed on line 10. The riser had a nominal diameter DN 200, the downcomer had a nominal diameter DN 100. The catalyst employed comprised a catalyst component prepared according to the procedure described below.

A Mg/alcohol adduct in spherical particle form was prepared as described in example 2 of U.S. Pat. No. 4,399,054, but operating at 3,000 rpm instead of 10,000 rpm the adduct was partially dealcoholated by heat at increasing temperatures from 30° C. to 180° C. operating in nitrogen current until a $EtOH/MgCl_2=1$ adduct was obtained. In a 1 liter flask equipped with a condenser and a mechanical agitator were introduced, under a nitrogen current, 625 ml of $TiCl_4$. At 0° C. while agitating were added 25 g of partially dealcoholated adduct. It was then heated up to 100° C. in 1 hour, when the temperature reached 40° C. diisobutylphtalate (DIBF) was added in a molar ratio Mg/DIBF=8. The temperature was maintained at 100° C. for 2 hours, it was then left to decant and afterwards the hot liquid was siphoned off. 550 ml of $TiCl_4$ were added and it was heated to 120° C. for 1 hour. Finally, it was left to settle and liquid was siphoned off while hot; the residual solid was washed 6 times with 200 ml aliquots of anhydrous hexane at 60° C. and 3 times at room temperature. The solid was then dried under vacuum. A spherical catalytic component was obtained having a Ti content by weight of 2.2% and a DIBF content by weight of 6.8%.

Such catalyst component was used with dicyclopentyldimethoxysilane as external donor and with triethylaluminium (TEAL). The molar ratio TEAL/Ti was 250; the molar ratio TEAL/external donor was 9. The recirculated gas was completely reintroduced through line 10 except a minor amount recirculated through line 9 to carry the circulating polymer through section 5. The temperature throughout the reactor was kept at about 65° C. and the pressure at about 18 bar.

Other operative conditions and the characteristics of the produced polymer are indicated in Table 7.

TABLE 1

| Example | Barrier feed Propylene Kg/h | Gas flow (riser) Kg/h | $H_2$ feed g/h | $H_2$/propylene (riser) Molar ratio | MIL g/$10^9$ | % insol. wt. % | P.I. | MEF MPa | Yield $g_{pol}/g_{cat}$ |
|---|---|---|---|---|---|---|---|---|---|
| 1* | 0 | 8400 | 180 | 0.042 | 10 | 98.71 | 3.5 | 2000 | 34000 |
| 2 | 280 | 6250 | 2000 | 0.31 | 2 | 98.48 | 7.78 | 2170 | 28000 |
| 3 | 280 | 5300 | 3500 | 0.54 | 7 | 97.67 | 8.18 | 2070 | 27000 |
| 4 | 280 | 5300 | 4100 | 0.56 | 10 | 97.90 | 9.14 | 2240 | 25000 |
| 5 | 280 | 5900 | 3300 | 0.29 | 10 | 97.95 | 9.31 | 2230 | 40000 |
| 6 | 280 | 8100 | 780 | 0.1 | 10 | 98.29 | 8.19 | 2110 | 33000 |
| 7* | 0 | 8800 | 260 | 0.050 | 8 | 99.13 | 4.29 | 2140 | 33000 |

TABLE 1-continued

| Example | Barrier feed Propylene Kg/h | Gas flow (riser) Kg/h | $H_2$ feed g/h | $H_2$/propylene (riser) Molar ratio | MIL g/$10^9$ | % insol. wt. % | P.I. | MEF MPa | Yield $g_{pol}/g_{cat}$ |
|---|---|---|---|---|---|---|---|---|---|
| 8 | 280 | 6000 | 3400 | 0.36 | 11 | 99.00 | 5.85 | 2270 | 26000 |
| 9 | 280 | 4250 | 4000 | 0.43 | 3.2 | 98.97 | 9.18 | 2005 | 27000 |
| 10* | 0 | 6625 | 350 | 0.048 | 10 | 99 | 4.32 | 1935 | 33000 |
| 11 | 280 | 4284 | 3400 | 0.35 | 10 | 99 | 6.28 | 1960 | 28000 |
| 12 | 280 | 3800 | 3700 | 0.38 | 14 | 99 | 8.19 | 2370 | 25000 |
| 13 | 300 | 3800 | 3500 | 0.33 | 11 | 98.9 | 7.83 | n.d. | 23000 |
| 14* | 0 | 5000 | 270 | 0.047 | 11 | 99.2 | 3.97 | 2121 | 31000 |
| 15 | 280 | 3210 | 4000 | 0.47 | 3.5 | 98.6 | 11.9 | 2226 | 26000 |
| 16 | 280 | 2000 | 6000 | 0.55 | 5.7 | n.d. | 12.3 | n.d. | 25000 |
| 17 | 280 | 2100 | 5500 | 0.70 | 3.5 | 98.3 | 9.79 | 1910 | 26000 |
| 28 | 200 | 2100 | 4300 | 0.62 | 4.0 | 98.5 | 11.2 | 1900 | 26000 |
| 19 | 180 | 2100 | 4300 | 0.67 | 5.0 | 98.5 | 10.2 | 1890 | 26000 |
| 20 | 180 | 5200 | 1500 | 0.45 | 2.5 | 98.4 | 16.38 | 2290 | 30000 |
| 21 | 180 | 3720 | 2200 | 0.55 | 0.6 | 98.8 | 15.67 | 2155 | 25000 |
| 22 | 180 | 6000 | 2000 | 0.53 | 4.5 | 98.6 | 25.17 | 2100 | 22000 |
| 23 | 80 | 6000 | 1190 | 0.58 | 7.0 | 98.4 | 19.0 | 1970 | 21000 |
| 24 | 60 | 5900 | 1130 | 0.70 | 6.6 | 98.8 | 22.68 | 2350 | 22000 |
| 25 | 150 | 3300 | 2600 | 0.53 | 16 | 99 | 14.5 | 2580 | 16100 |
| 26 | 200 | 5100 | 1600 | 0.15 | 3 | 98.7 | 22.27 | 2360 | 15000 |
| 27 | 200 | 5050 | 3500 | 0.3 | 15 | 98.4 | 30.42 | 2460 | 15000 |
| 28 | 140 | 4500 | 3400 | 0.37 | 4 | 98 | 35.58 | 2500 | 13300 |
| 29 | 140 | 4440 | 4100 | 0.38 | 22 | 98 | 11.37 | 2460 | 4000 |
| 30 | 140 | 5050 | 1100 | 0.15 | 29 | 98 | 7.39 | 2250 | 20500 |
| 31 | 140 | 5050 | 1350 | 0.15 | 10 | 98.4 | 15.4 | 2240 | 17700 |
| 32 | 140 | 4650 | 2100 | 0.25 | 13 | 98.3 | 44 | 2480 | 17000 |
| 33 | 140 | 4700 | 3000 | 0.3 | 22 | 98.4 | 8.88 | 2335 | 11000 |
| 34* | 0 | 7200 | 400 | 0.055 | 40 | 98.9 | 3.95 | 1835 | 19300 |

*comparison example; n.d. = not determined.

TABLE 2

| Example | Barrier feed Ethylene Kg/h | Barrier feed Propane Kg/h | Barrier feed Butene g/h | Recirculated gas flow Kg/h | $H_2$/ethylene (riser) Molar ratio | MIE g/$10^9$ | F/E | Polymer density Kg/$m^3$ | Yield $g_{pol}/g_{cat}$ |
|---|---|---|---|---|---|---|---|---|---|
| 35* | 0 | 0 | 0 | 4100 | 0.155 | 0.18 | 31 | n.d. | 13500 |
| 36 | 10 | 100 | 0 | 3900 | 0.8 | 0.14 | 71.4 | n.d. | 7500 |
| 37 | 9 | 120 | 0 | 3165 | 1.8 | 0.20 | 105 | 0.9555 | 11300 |
| 38 | 5 | 130 | 125 | 3000 | 2.2 | 0.15 | 157 | 0.9475 | 8400 |

*= comparison example

TABLE 3

| Example | Barrier feed Propylene Kg/h | Gas flow (riser) Kg/h | $H_2$ feed g/h | $H_2$/propylene (riser) Molar ratio | $C_2/(C_2 + C_3)$ (riser) Molar ratio | MIL g/$10^9$ | % insol. wt. % | Bound ethylene wt. % | Yield $g_{pol}/g_{cat}$ |
|---|---|---|---|---|---|---|---|---|---|
| 39 | 200 | 7000 | 400 | 0.02 | 0.025 | 1.2 | 98.5 | 1.4 | 15000 |

TABLE 4

| Example | Barrier feed Propylene + $H_2$ − 1% mol. Kg/h | Gas flow (riser) Kg/h | $H_2$ feed g/h | H2/propylene- (riser) Molar ratio | H2/propylene- (downcomer) Molar ratio | MIL g/10' | % insol. wt. % | P.I. | Yield $g_{pol}/g_{cat}$ |
|---|---|---|---|---|---|---|---|---|---|
| 40 | 235 | 5500 | 3000 | 0.35 | 0.0098 | 24 | 98.3 | 11.7 | 19100 |
| 41 | 235 | 5650 | 3000 | 0.33 | 0.0098 | 28 | 98.3 | 7.8 | 18500 |
| 42 | 450 | 6600 | 3000 | 0.31 | 0.0052 | 33 | 98.4 | 6.4 | 17900 |

TABLE 5

| Example | Barrier feed Propylene Kg/h | Gas flow (riser) Kg/h | H2/propylene- (riser) Molar ratio | ethylene-/ ethylene- + propylene- (riser) Molar ratio | MIL g/10' | % insol. wt. % | P.I | DSC ° C. | Bound ethylene wt. % | Yield $g_{pol}/g_{cat}$ |
|---|---|---|---|---|---|---|---|---|---|---|
| 43 | 120 | 7340 | 0.027 | 0.013 | 2.3 | 98.2 | 4.92 | 160.3 | 1.1 | 26300 |

TABLE 6

| Ex. | Barrier feed Propylene Kg/h | Gas flow (riser) Kg/h | H2/propylene- (riser) Molar ratio | ethylene-/ ethylene- + propylene- (riser) Molar ratio | H2/propylene (downcomer) Molar ratio | ethylene-/ ethylene- + propylene- (downcomer) Molar ratio | MIL g/10' | % insol. wt. % | P.I | DSC ° C. | Bound ethylene wt. % | MEF Mpa | Yield $g_{pol}/g_{cat}$ |
|---|---|---|---|---|---|---|---|---|---|---|---|---|---|
| 44 | 140 | 5625 | 0.045 | 0.055 | 0 | 0.006 | 1.6 | 86.5 | 4.8 | 142.6 | 5.6 | 780 | 20500 |

TABLE 7

| Ex. | Barrier feed Propylene Kg/h | Gas flow (riser) Kg/h | H2/ethylene- (riser) Molar ratio | Ethylene/ ethylene + propylene (riser) Molar ratio | H2/propylene- (downcomer) Molar ratio | MIL g/10' | % sol. wt. % | I.V. of the soluble fraction dl/g | Hardness (Shore D) points | DSC ° C. | Bound ethylene wt. % | MEF MPa | Yield gpol/gcat |
|---|---|---|---|---|---|---|---|---|---|---|---|---|---|
| 45 | 200 | 3800 | 0.03 | 0.2 | 0.03 | 0.65 | 48.7 | 3.66 | 45 | 160.3 | 21.5 | 400 | 16600 |

What is claimed is:

1. A process for the catalytic polymerization in the gas-phase carried out in at least two interconnected polymerization zones, the process comprising feeding one or more monomers to said polymerization zones in the presence of catalyst under reaction conditions and collecting the polymer product from said polymerization zones, in which process the growing polymer particles flow upward through one of said polymerization zones (riser) under fast fluidization or transport conditions, leave said riser and enter another polymerization zone (downcomer) through which they flow downward under the action of gravity, leave said downcomer and are reintroduced into the riser, thus establishing a circulation of polymer between the riser and the downcomer, wherein:

means are provided which are capable of totally or partially preventing the gas mixture present in the riser from entering the downcomer, and a gas and/or liquid mixture having a composition different from the gas mixture present in the riser is introduced into the downcomer.

2. The process according to claim 1, wherein the introduction into the downcomer of the said gas and/or liquid mixture having a composition different from the gas mixture present in the riser is effective in preventing the latter mixture from entering the downcomer.

3. The process according to claim 2, wherein the introduction of the gas and/or liquid mixture of different composition into the downcomer establishes a net gas flow upward at the upper limit of the downcomer.

4. The process according to claim 2 or 3, wherein the introduction of the gas and/or liquid mixture of different composition into the downcomer is effected through one or more introduction lines placed into the downcomer.

5. The process according to claim 4, wherein said one or more introduction lines are placed at a point close to the upper limit of the volume occupied by the densified solid.

6. The process according to claim 1 or 2, wherein the gas and/or liquid mixture having a composition different from the gas mixture present in the riser is introduced into the downcomer in partially or totally liquefied form.

7. The process according to claim 6, wherein said partially or totally liquefied mixture is sprinkled over the upper surface of the bed of densified polymer particles.

8. The process according to claim 1 or 2, wherein more than one downcomers are provided, the gas mixture arriving from the riser being prevented to enter only into some of the downcomers, while in the other downcomer(s) the circulation of said gas mixture is permitted.

9. The process according to claim 8, wherein gas and/or liquid mixtures having compositions different among them and also different from the composition of the gas mixture present in the riser are fed to the different downcomers.

10. The process according to claim 6, wherein the gas-mixture circulating in the riser consists of components having different volatility and part of it is compressed and cooled to partly condense, the liquid part thus obtained being sent to the downcomer.

11. The process according to claim 10, wherein the said gas-mixture circulating in the riser contains hydrogen.

12. The process according to claim 10, wherein the said gas-mixture circulating in the riser contains ethylene, propylene and optionally an inert alkane.

13. The process according to claim 10, wherein the upper part of the downcomer is used as a stripping column to remove the most volatile component(s) from the liquid fed to the downcomer, the said component(s) being made to flow upwards.

14. An apparatus for polymerizing olefins via catalytic polymerization in the gas-phase carried out in at least two interconnected polymerization zones, the apparatus comprising:

means for feeding one or more monomers to the polymerization zones in the presence of catalyst under reaction conditions;

means for collecting the polymer product from said polymerization zones;

means for moving the polymer product in an upward flow through a first one of the polymerization zones under fast fluidization conditions;

means for moving the polymer product into at least a second one of the polymerization zones by downward flow under the action of gravity;

means for removing the polymer product from the at least second one of the polymerization zones;

means for reintroducing the polymer product into the first one of the polymerization zones, thus establishing a circulation of polymer between the polymerization zones;

means for at least partially preventing a gas mixture present in the first one of the polymerization zones from entering the at least second one of the polymerization zones; and means for introducing a gas and/or liquid mixture which has a composition different from the gas mixture present in the first one of the polymerization zones into the at least second one of the polymerization zones.

15. The apparatus of claim 14 comprising a first vertical reactor (1), a second vertical reactor (2), the upper region of said reactor (1) being connected by a connecting part (3) to a solid gas separator (4), which is in turn connected to the upper region of said second reactor (2) the lower region of said second reactor (2) being connected to the lower region of said first reactor (1) by a connecting part (5), said solid/gas separator (4) being connected through a recycle line (6) to one or more points of reintroduction into said connecting part (5) or into said reactor (1), said apparatus having a line (12) for catalyst feeding into said reactor (1), a polymer discharge system (11) from said reactor (2), a line (13) for feeding monomers, the said apparatus being further characterized in that it comprises a line (15) for feeding gas or liquid into said reactor (2).

16. The apparatus according to claim 15, wherein the line (15) for feeding gas or liquid into said reactor (2) is placed in the upper part of said reactor (2).

17. The apparatus according to claim 15 comprising a line (18) connecting the recycle line (6) to a condenser (19), connected to the reactor (2) through the line (15) for feeding gas or liquid into the said reactor (2) and back to line (6) through a line (20) for recycling gases.

18. The apparatus according to claim 15 comprising a line (18) connecting the recycle line (6) to a condenser (19), connected to a separating vessel (22) connected to the reactor (2) through the line (15) for feeding gas or liquid into the said reactor (2) and back to line (6) through a line (20) for recycling gases.

19. The apparatus according to claim 17, wherein the line (15) for feeding gas or liquid into the reactor (2) is equipped with a heater (24).

20. The apparatus according to claim 15, wherein the upper part (25) of the reactor (2) has a larger diameter than the rest of the reactor.

21. The apparatus according to claim 15, wherein an exit from the riser (1) is shaped as a restriction.

22. The apparatus according to claim 15, wherein the section (3), connecting the riser (1) to the separator (4), has a smaller diameter than the riser (1).

23. The apparatus according to claim 15, wherein the riser (1) and the section (3) form an angle, wherein the angle provides increased residence time in the riser (1) for the polymer product.

* * * * *